UNITED STATES PATENT OFFICE.

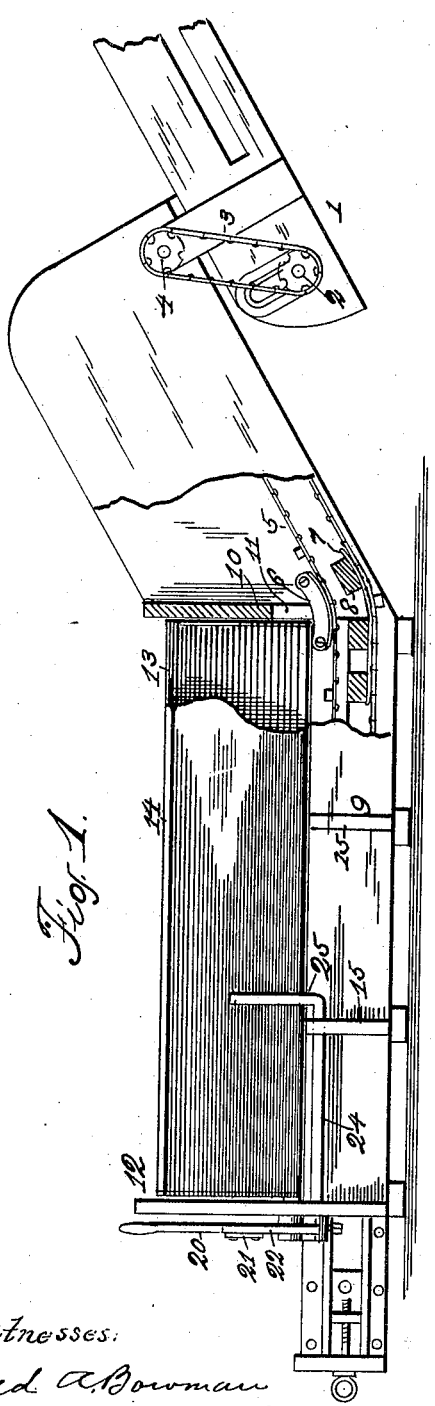

JOHN V. CIZEK, OF CLUTIER, IOWA.

HOPPER FOR GRAIN-ELEVATORS.

1,092,093.  Specification of Letters Patent.  Patented Mar. 31, 1914.

Application filed July 28, 1913. Serial No. 781,523.

*To all whom it may concern:*

Be it known that I, JOHN V. CIZEK, a citizen of the United States, residing at Clutier, in the county of Tama and State of Iowa, have invented certain new and useful Improvements in Hoppers for Grain-Elevators, of which the following is a specification.

This invention relates to grain-unloading mechanism used in connection with a portable elevator adapted to convey the dumped grain to a crib or storehouse.

The object of this invention is to provide a simple and convenient receiving conveyer for the dumped grain, so constructed that the wagon load of grain may be driven over it, and when in proper dumping position with relation to said elevator, the elevator may be adjusted to form a hopper to catch the grain, and from which the grain is conveyed to its destination.

In the accompanying drawing, forming a part of this specification, Figure 1 is a side view of a device embodying the invention, a part of it being broken away to show the internal construction. Fig. 2 is a view of the same as seen from the left end of Fig. 1, and showing also portions of the wagon platform and the incline leading thereto. Fig. 3 is also an end view, but with the end-board removed, so as to show the construction and arrangement of the hopper sides, and in their depressed position to form a part of the wagon platform.

In the drawing 1 designates the grain-elevating conveyer, which is of a familiar type, and need not be particularly described. This conveyer is operated by a sprocket 2, chain 3, and another sprocket 4 near the upper end of the receiving hopper, to which motion is imparted in any suitable way, not shown.

The receiving hopper is preferably of the angular form shown, one end being inclined upwardly so as to overlap the lower end of the elevator. The sides of this inclined part form a housing of practically the same width as the elevator, which receives the grain therefrom in a well known way. The conveying apron 5 is driven in a familiar way, but at the angle is carried under curved shoes 6 and 7. The former are flanged plates attached to the sides of the housing, and the latter are plates attached to cross-bars 8.

The horizontal portion of the receiving elevator, or dump comprises a continuation of the housing, 9, which need not be particularly described, except as to features hereinafter to be noted. At the angle is a front-board 10 extending considerably each side of the housing, so as to form an inner end for the hopper, to be described presently. This end-board has an opening at 11 to allow the grain to be carried through by the conveyer. Near the rear or outer end is a similar board 12, with, of course, an opening through it for the conveyer to pass through. Between these end-boards is pivoted a pair of side-boards 13 and 14, respectively, adapted to fold downwardly both in the same direction. When so folded, the board 13 covers the conveyer, as shown in Fig. 3, and the other rests on cross-timbers 15, and meets a platform 16, of which a fragment is shown in Fig. 2. This platform consists simply of sills 17 and cross-planks 18, is long enough to support a wagon, and is supposed to have the same incline as the approach 19, which is of similar construction. In practice neither the approach nor the platform are attached to the dump, but are laid on the ground adjacent, so that a wagon loaded with grain may be driven over the dump, and while standing on the platform may be tilted to discharge its contents from the rear end into the hopper.

To one pivot of the side-board 13, which extends through the rear end-board, is attached a hand-lever 20. This connects by a link 21 with a short lever 22, which might be attached to a similar pivot on the other side-board in the same way. In practice, however, it is preferred to hinge this side-board to the housing of the dump, as shown at 23, Fig. 3, and lift it to hopper position by means of a rock-shaft 24, to which the lever 22 is attached, and which is provided with a lifting lever 25 at its outer end to engage the under side of the side-board. The rock-shaft is pivoted in a cross-timber 15 and the outer end-board, as shown.

It will be evident that this construction is of great convenience in the unloading of grain, as, when once set, it does not have to be shifted, the mere raising and lowering of the hopper side-boards permitting the passing and dumping of loads indefinitely.

Having thus described my invention, I claim:

In a grain receiving conveyer, or dump, the combination of a traveling apron, a housing therefor, a hopper, comprising end-boards attached to the housing, interposed, pivoted side-boards adapted to fold downwardly both in the same direction, and forming part of a continuous platform when so folded, a lever connecting with one of said side-boards, a rock-shaft adjacent to the other and provided with a lift-lever adapted to engage said other side-board at the under side, a lever by which the rock-shaft is turned, and a link connecting the same with the lever which tilts the first-named side-board.

In testimony whereof I affix my signature in presence of two witnesses.

JOHN V. CIZEK.

Witnesses:
EMMA G. SUFFICOOL,
J. M. ST. JOHN.

Copies of this patent may be obtained for five cents each, by addressing the "Commissioner of Patents, Washington, D. C."